US006832894B2

(12) United States Patent
Levallard et al.

(10) Patent No.: US 6,832,894 B2
(45) Date of Patent: Dec. 21, 2004

(54) COMBINED BALL-AND-DAMPER DEVICE FOR A HELICOPTER ROTOR

(75) Inventors: Patrice Levallard, Bry sur Marne (FR); Thierry Sieg, Vineuil St Firmain (FR)

(73) Assignee: Hutchinson, Paris (FR)

( * ) Notice: Subject to any disclaimer, the term of this patent is extended or adjusted under 35 U.S.C. 154(b) by 48 days.

(21) Appl. No.: 10/414,305

(22) Filed: Apr. 16, 2003

(65) Prior Publication Data

US 2004/0001754 A1 Jan. 1, 2004

(30) Foreign Application Priority Data

May 24, 2002 (FR) .......................................... 02 06337

(51) Int. Cl.⁷ .............................................. B64C 27/38
(52) U.S. Cl. .................... 416/134 A; 416/135; 416/140
(58) Field of Search .......................... 416/134 R, 134 A, 416/135, 136, 140

(56) References Cited

U.S. PATENT DOCUMENTS

| | | | | |
|---|---|---|---|---|
| 3,791,234 A | * | 2/1974 | Kastan et al. ............. | 74/579 R |
| 4,244,677 A | | 1/1981 | Noehren et al. | |
| 4,257,739 A | * | 3/1981 | Covington et al. ..... | 416/134 A |
| 5,228,834 A | | 7/1993 | Yamamoto et al. | |
| 5,489,193 A | * | 2/1996 | Levallard .................... | 416/140 |
| 6,045,328 A | * | 4/2000 | Jones ......................... | 416/140 |
| 6,113,352 A | | 9/2000 | Certain et al. | |

FOREIGN PATENT DOCUMENTS

EP          0451084          10/1991

OTHER PUBLICATIONS

B. Panda et al., "Aeroelastic Stability Wind Tunnel Testing with Analytical Correlation of the Comanche Bearingless Main Rotor", Journal of the American Helicopter Society, New York, US, vol. 42, No. 3, Jul. 1, 1997, pp. 207–217, XP000693775, ISSN: 0002–8711.

* cited by examiner

Primary Examiner—Hoang Nguyen
(74) Attorney, Agent, or Firm—Clark & Brody

(57) ABSTRACT

The invention relates to a combined ball-and-damper device for mounting between firstly a flexible spar connecting a helicopter blade to a rotor hub and secondly a torque tube for controlling the pitch of said blade, the device comprising two individual modules each comprising a plane laminated damper and a laminated ball, the laminated damper extending between an outer end and an inner end and presenting at its outer end an element for connection to the torque tube for controlling the pitch of said helicopter blade, and the laminated ball presenting a stack of metal and elastomer layers, the laminated damper being secured at its inner end to an outer end of the ball whose own inner end presents an element for fixing to said flexible spar, the device including at least one connection element providing a stiffening connection between the outer ends of the two balls of the two individual modules making up the combined device.

16 Claims, 3 Drawing Sheets

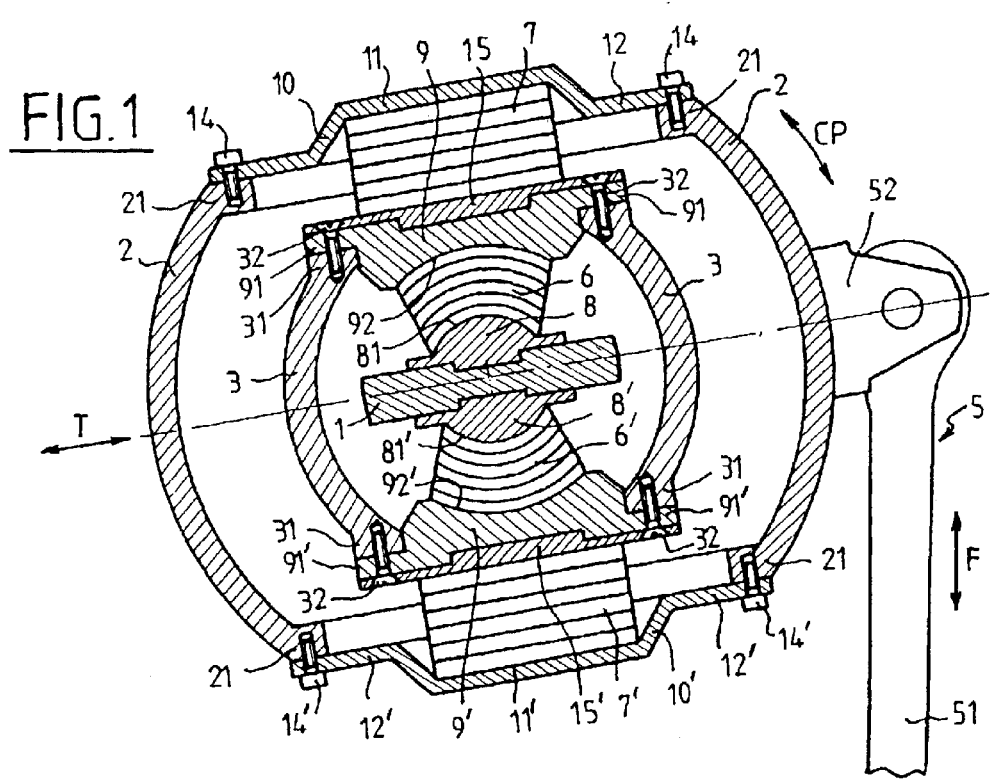
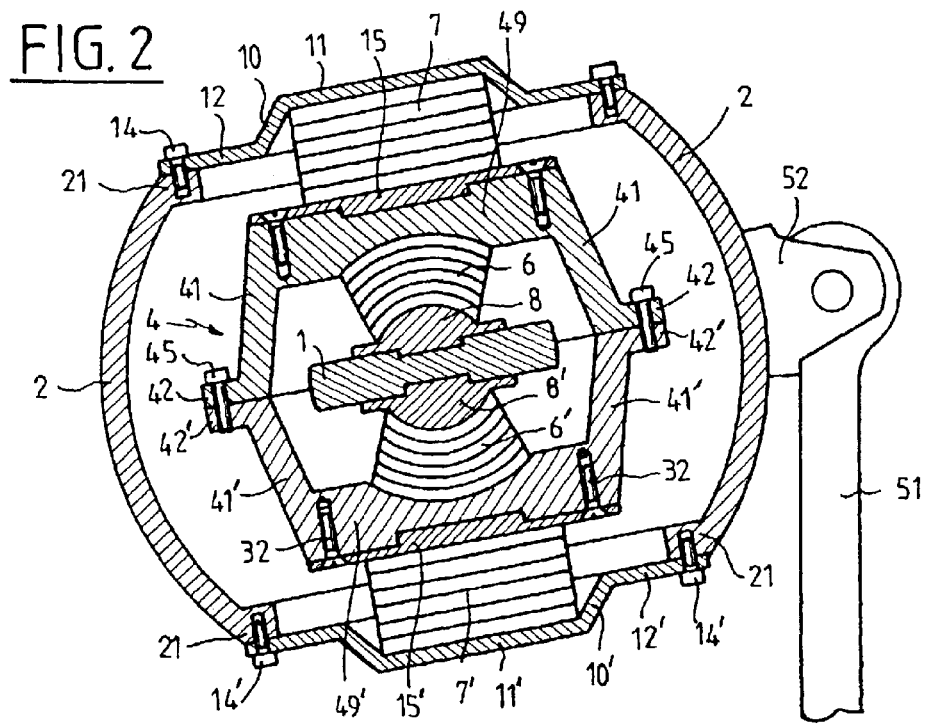

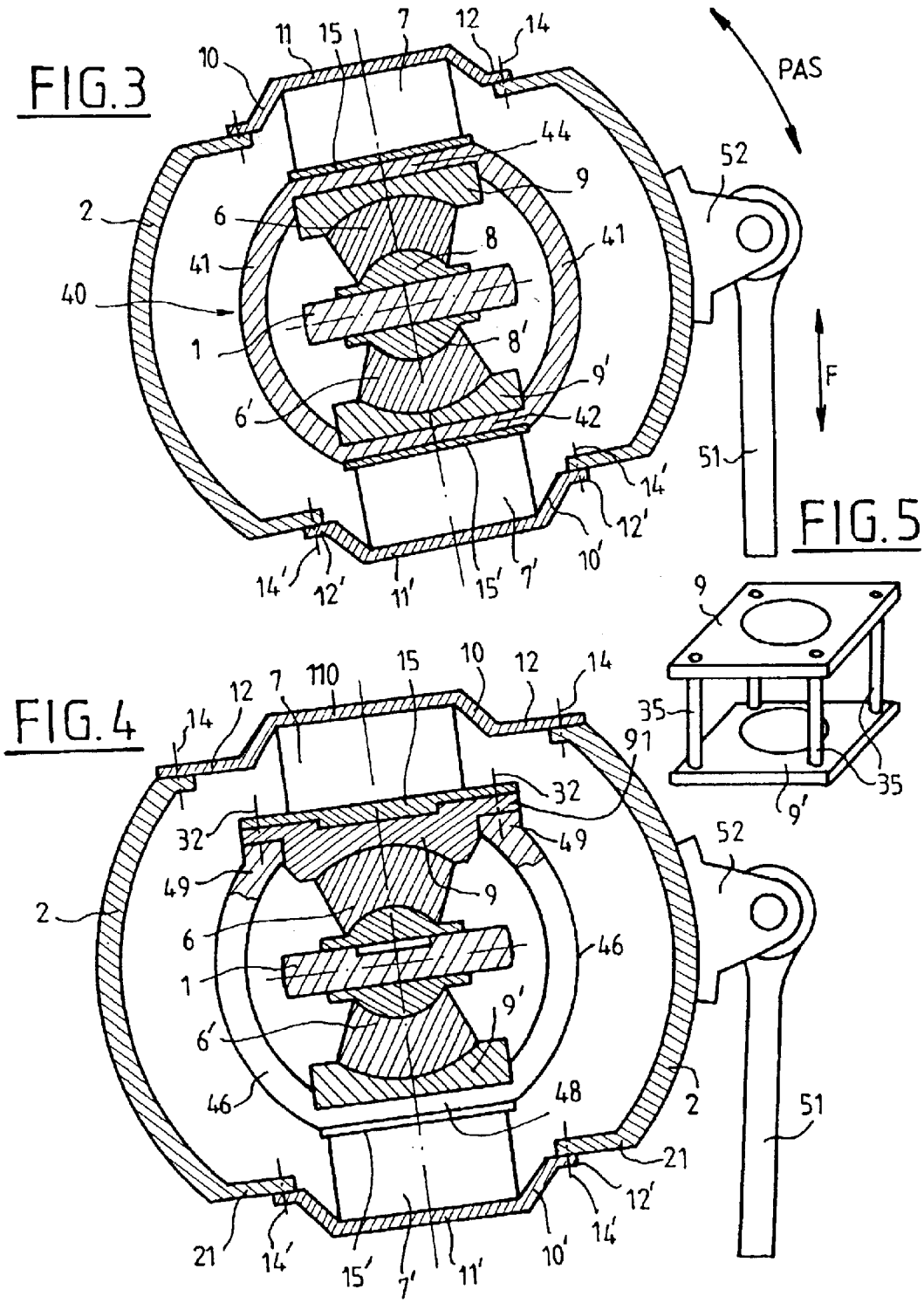

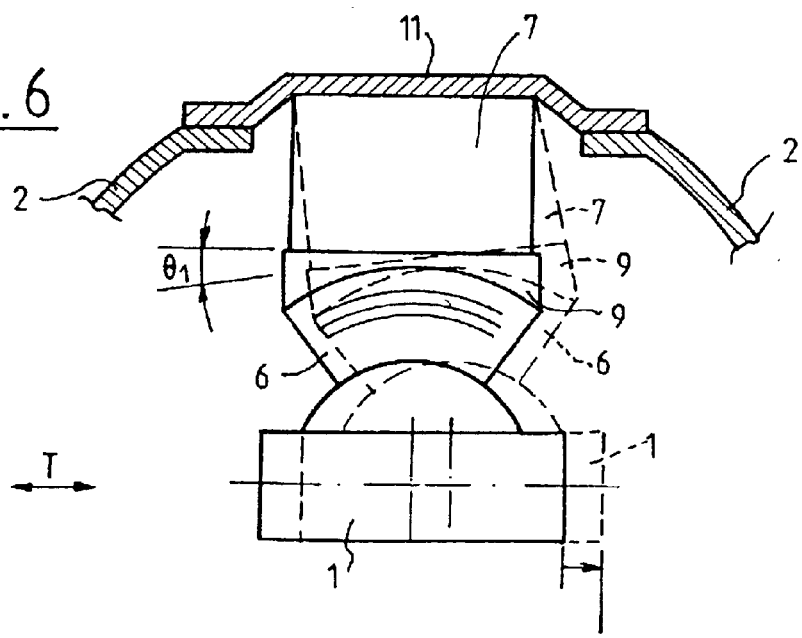
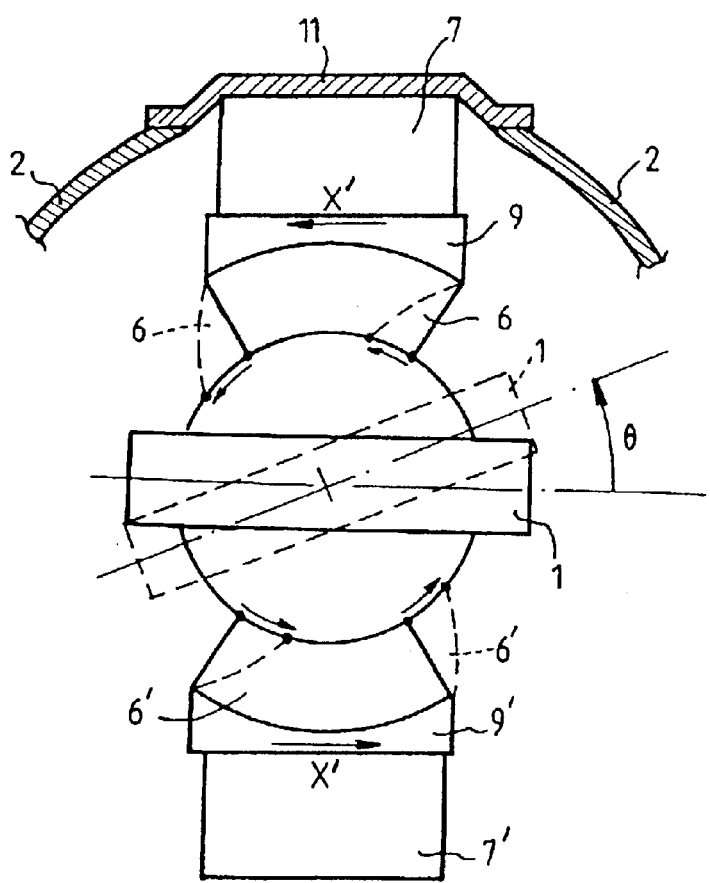

COMBINED BALL-AND-DAMPER DEVICE FOR A HELICOPTER ROTOR

The present invention relates to a combined ball and-damper device for mounting between a flexible spar connecting a helicopter blade to a rotor hub, and a torque tube for controlling the pitch of said blade.

BACKGROUND OF THE INVENTION

U.S. Pat. No. 4,244,677 and EP patent No. 0 451 084 (United Technologies Corporation) disclose combined devices each comprising two individual modules, each module comprising a laminated damper and a laminated ball. The laminated damper comprises a stack of alternating layers of metal and of elastomer, extending between an outer end an inner end of the damper. At its outer end, the laminated damper has an assembly element connected to the pitch control torque tube, and at its inner end, it is secured to an outer end of the ball of the module, whose own inner end presents an element for fixing to the flexible spar.

Such a combined device (also referred to as a "snubber") is used with a flexible spar of a rotor hub which does not present any ball bearings (known as a "bearingless main rotor" or BMR), and it serves to position the components of the rotor (blades/flexible spar/torque tube for controlling pitch) and to provide damping of the natural mode of vibration of the blades.

A BMR type rotor hub is constituted by a flexible spar structure, i.e. a strip, generally of composite material, connecting the blade to the rotor hub and tensioned by the centrifugal force imposed by the rotor rotating about said hub. A torque tube surrounds the spar, being fixed to the base of the blade and serving to impart twisting about the main axis common to the blade and to the spar. This "pitch" control enables the helicopter to be controlled.

Given the forces and the displacements that result from this imposed pitch control and the aerodynamic interaction between the blade and the surrounding air, and also the interaction between the rotor assembly and the structure of the helicopter, it is necessary:

to maintain the positioning (centering) of the torque tube relative to the spar. This is an abutment or "snubber" function serving essentially to take up the compression forces due to the blade flapping;

to decouple the torque tube and the spar in terms of rotation about their common axis. The twisting imposed by controlling pitch gives rise to highly differing amounts of twist between the torque tube and the spar due to the geometry of the system. The combined device must therefore accommodate this differential twisting; and to accommodate displacement in translation due to the aerodynamic drag on the blade associated with its rotation. Drag imparts shear that alternates in direction in the general plane of the rotor, perpendicularly to the above-described plane of excitation in flapping.

Each of the two above-mentioned documents (U.S. Pat. No. 4,244,677 and EP 0 451 084) describes a combined device (a "snubber") itself constituted by two modules, each comprising a stack made up of a generally spherical portion and a generally plane portion, each portion being made of different materials, and together providing the ability to satisfy the three above-mentioned functions.

The laminated structure provides the ability to withstand compression or "flapping" forces. The generally spherical shape also makes it possible to provide the system with rotary decoupling. The plane portion serves to accommodate the movement in translation associated with aerodynamic drag.

Those combined ball-and-damper modules are associated opposite ways round in pairs to form respective assemblies for use in installing and operating each of the blades of the rotor.

U.S. Pat. No. 4,244,677 essentially describes means for externally applying prestress. That prestress is applied simultaneously to both of the two modules each comprising a plane damper and a ball in order to guarantee that there is no traction stress in the structure of either element, thereby extending its lifetime. It should nevertheless be observed that that prestress is the same both in the plane damper and in the ball.

The Applicant company has found that a combined ball-and-damper structure as described above leads to two fundamental problems which prevent optimum functioning of the rotor and of the combined snubbers themselves:

the rotary decoupling provided by the spherical portion of the combined unit is incomplete because of the general flexibility of the damper units; and the combination of loads and displacements that are imposed can be computed only by taking account of the mutual interaction of those loads and displacements, and of their interactions with the particular flexibility of the combined snubber elements about their various axes, which means that the instantaneous center of rotation of the torque tube depends on the combination of imposed displacements and loads and lies neither on the geometrical center of the installed combined snubber unit, nor on the main axis of symmetry of the sleeve; and the combination of loads that result from the flexibilities is complex, and it depends on the particular embodiment of the structures of the combined snubber elements.

OBJECTS AND SUMMARY OF THE INVENTION

It results from the above that there exists a need to improve the lifetime of such combined ball-and-damper devices, while remedying at least one of the above-mentioned problems.

The present invention relies in particular on recognizing the fact that in the presence of shear stresses in aerodynamic drag mode, the two intermediate plates interconnecting the spherical portions with the plane portions do not remain parallel.

The idea on which the present invention is based is to introduce a stiffening or securing connection between the two modules via their interfaces between their plane laminated dampers and their balls.

The invention thus provides a combined ball-and-damper device for mounting between firstly a flexible spar connecting a helicopter blade to a rotor hub and secondly a torque tube for controlling the pitch of said blade, the device comprising two individual modules each comprising a plane laminated damper and a laminated ball, whose damping action can be provided in conventional manner by rubber or by an internal hydraulic device, the laminated damper extending between an outer end and an inner end and presenting at its outer end an element for connection to the torque tube for controlling the pitch of said helicopter blade, and the laminated ball presenting a stack of metal and elastomer layers, the laminated damper being secured at its inner end to an outer end of the ball whose own inner end presents an element for fixing to said flexible spar, the device including at least one connection element providing a stiffening connection between the outer ends of the two balls of the two individual modules making up the combined device.

Said connection between the inner end of the plane laminated damper and the outer end of the ball can be provided by means of at least one intermediate plate.

In a first variant, the connection element is a tube surrounding both balls and providing said connection between the laminated dampers and the balls of the two individual modules constituting the combined device.

In a second variant, the connection element is an open tube providing the connection between a laminated damper and a ball in one of the two individual modules, with the open edges of said open tube being secured to the outer end of the ball of the other individual module.

In another variant, the connection element is a piece interconnecting the facing outer ends of the two balls of the combined device. Said piece is advantageously curvilinear and presents a concave side facing towards the balls of the combined device, thus making it possible to go round the side of the flexible spar.

In another variant, a said piece is made up of tie bars, there being four tie bars, for example.

In a preferred variant, the device has a pair of connection elements each presenting a central region forming a connection between the inner end of a laminated damper and the outer end of a ball, and lying on at least one side beside a side region secured to a corresponding side region of the other connection element of the pair.

The connection element(s) may advantageously be dimensioned in such a manner that after the combined device has been assembled between a flexible spar and a pitch control tube, a first amount of compression prestress is applied to the two balls of the combined device.

The elements for assembling the combined device on the pitch control tube are advantageously dimensioned in such a manner that once the combined device has been assembled, a second amount of compression prestress is applied to the laminated dampers.

The first and second amounts of prestress may have different values, which makes it possible to select each of them in optimum manner for each of the elements (the damper and the ball) of the combined device.

The invention also provides a helicopter rotor comprising at least one combined device as defined above mounted between a flexible spar and a pitch control tube of a helicopter blade. Such an assembly can be provided in such a manner as to apply a first amount of compression prestress to the balls, and/or a second amount of compression prestress to the laminated dampers, with the first and second amounts of prestress advantageously being different.

BRIEF DESCRIPTION OF THE DRAWINGS

Other characteristics and advantages of the invention appear better on reading the following description in connection with the accompanying drawings, in which FIGS. 1 to 5 show embodiments of the invention, and FIGS. 6 and 7 show the advantages of the invention.

MORE DETAILED DESCRIPTION

In FIG. 1, in order to control a blade, a rotor comprises a spar 1 that is generally made of composite material and a torque tube 2 which surrounds the spar 1 and which, under the action of a pitch actuator element 51 movable in the direction F and connected at 52 to the periphery of the torque tube 2 serves to control the pitch of the blade, and thus to enable the helicopter to be controlled.

The combined device presents two modules mounted on either side of the spar 1, each module presenting in series a laminated ball (6, 6') and a plane laminated damper (7, 7'). The laminated ball (6, 6') is fixed to the spar 1 via an inner plate (8, 8') which presents a curved outline (81, 81') corresponding to the innermost layer of the cylindrical or hemispherical laminated metal and elastomer structure constituting each ball (6, 6').

Outwardly, the ball (6, 6') presents an outer plate (9, 9') having an inner plate (15, 15') of a plane laminated damper (7, 7') fixed thereto by screws 32. Finally, each plane laminated damper (7, 7') presents an outer plate (10, 10') whose central portion 11' corresponds to the stack of laminated layers, and which lies between extensions (12, 12') on either side, enabling it to be fixed to the ends 21 of the torque tube 2 by screws (14, 14').

In the invention, the common plane between a ball 6 and a damper 7, as embodied by the plate 9 or 15, is secured to the common plane between the balls 6' and the damper 7', as embodied by the plate 9' or 15', by means of one or more connection elements.

This makes it possible to ensure, that under the action of shear generated by drag forces T on the blade (see FIG. 6), which forces are taken up by the spar 1 with relative translation (arrow X) occurring between the spar 1 and the torque tube 2 (see the two positions drawing continues lines and dashed lines in FIG. 6), no loss of parallelism arises between the above-mentioned planes (turning of the plate 9 through $\theta_1$ in FIG. 6), due in particular to the fact that the plane laminated damper cannot be made stiff enough to prevent such turning.

This also makes it possible, during relative turning between the spar 1 and the torque tube 2 through an angle θ due to the pitch control, to avoid any antisymmetrical offset occurring in the drag plane between the plates 9 and 9' (arrows X' in FIG. 7).

In the invention, an open or closed intermediate structure 3 is added to form, for example, a "coupling ring" surrounding the spar 1 and situated inside the torque tube 2.

Each element of the combined snubber device has an intermediate transition plate (9, 9') providing the connection between the spherical portion (ball 6, 6') and the plane portion (damper 7, 7').

The two intermediate plates belonging to respective modules of the combined device are themselves interconnected by this intermediate structure 3.

This structure is of an appropriate shape and it is made of a suitable material (for example a metal or a fiber-reinforced synthetic material or "composite") in order to provide a sufficiently rigid connection between the two above-mentioned intermediate plates.

A1) In this manner, and this constitutes an important difference, it is ensured that the two intermediate plates remain almost-parallel and that they are turned and/or caused to move in translation simultaneously as a unit. The rotation decoupling function is thus provided in far more rigorous manner. As a result, the combination of displacement and of loading is much more favorable. The plane dampers (7, 7') are significantly less stressed in rotation/bending, while the balls (6, 6') are less stressed in translation.

A2) The work between the two modules forming the combined ball and damper device is also better shared. This also improves the operation of the plane dampers. In the prior art configuration, rotation and translation add together for one of the modules of the combined device, while these two main stresses subtract for the other module disposed on the other side of the spar 1. This gives rise to a large amount of operating asymmetry which is corrected for the most part in the present invention.

Furthermore, on assembly of the combined snubber device, it is possible to apply different prestresses to the ball portions and to the plane damper portions. This can be done without particularly harming the general method of assembling combined snubber devices on the rotor, either in their central portions on the spars 1, or else on their outer portions on the torque tubes 2. These different prestresses for the plane damper and the ball of each module, as obtained by dimensioning the part 10, 10' and the connection elements, make it possible to match the device as closely as possible to the combination of loads seen by each of its parts.

This is significantly more effective than applying a common mean value as in U.S. Pat. No. 4,244,677 which can turn out to be too small for one of the parts and too great for the other.

Adding a stiffening connection in accordance with the invention thus makes it possible to achieve a significant improvement in the traction stresses that result from the combination of displacements and forces, without significantly modifying the design of the combined device, thereby obtaining a significant increase in the lifetime of the combined device. This is in addition to decoupling the drag and incidence stresses on the blade and to better positioning of the torque tube 2 relative to the spar 1.

In FIG. 1, stiffening is provided by one or two elements 3 which are fixed by the screws 32 between the facing ends 91 and 91' of the plates 9 and 9'. These elements may be continuous (for example curved plates with their concave sides directed towards the spar 1, as shown in FIG. 1), or they may be discontinuous elements, for example tie rods 35 as shown in FIG. 5.

In FIG. 2, the mechanical connection is provided by extensions 41 and 41' of intermediate plates 49 and 49' received between the elements (6 and 7, 6' and 7'). These extensions 41, 41' present fixing tabs 42, 42' enabling them to be assembled together by means of screws 45.

A stiffening element may also be molded on a laminated ball, e.g. in continuity with an intermediate plate 9, 9'. The molded elements are then fixed together to provide stiffening.

In FIG. 3, the mechanical connection is provided by a tube 40 which presents a flat 44 received between the ball 6 and the damper 7 and another flat 42 received between the ball 6' and the damper 7', with the remainder of the periphery 41 serving to provide the desired mechanical interconnection.

In FIG. 4, the mechanical connection is provided by an open tube presenting a flat 48 received between the ball 6' and the damper 7' and with the remainder of its periphery 46 providing the desired mechanical connection. For this purpose, the ends 49 of the open tube are fixed to the ends 91 of the plate 9 situated between the ball 6 and the damper 7 by means of the screws 32

What is claimed is:

1. A combined ball-and-damper device for mounting between firstly a flexible spar connecting a helicopter blade to a rotor hub and secondly a torque tube for controlling the pitch of said blade, the device comprising two individual modules each comprising a plane laminated damper and a laminated ball, the laminated damper extending between an outer end and an inner end and presenting at its outer end an element for connection to the torque tube for controlling the pitch of said helicopter blade, and the laminated ball presenting a stack of metal and elastomer layers, the laminated damper being secured at its inner end to an outer end of the ball whose own inner end presents an element for fixing to said flexible spar, the device including at least one connection element providing a stiffening connection between the outer ends of the two balls of the two individual modules making up the combined device.

2. A device according to claim 1, having at least one intermediate plate providing said connection between the inner end of the laminated damper and the outer end of the ball.

3. A device according to claim 1, wherein the connection element is a tube surrounding both balls and providing said connection between the laminated dampers and the balls of the two individual modules constituting the combined device.

4. A device according to claim 1, wherein the connection element is an open tube providing the connection between a laminated damper and a ball in one of the two individual modules, with the open edges of said open tube being secured to the outer end of the ball of the other individual module.

5. A device according to claim 1, wherein a said connection element is a part connecting together the facing outer ends of the two balls of the combined device.

6. A device according to claim 5, wherein a said connection element is curved and presents a concave side facing towards said balls of the combined device.

7. A device according to claim 5, wherein a said piece is a tie bar.

8. A device according to claim 1, having a pair of connection elements each presenting a central region forming a connection between the inner end of a laminated damper and the outer end of a ball, and lying on at least one side beside a side region secured to a corresponding side region of the other connection element of the pair.

9. A device according to claim 1, wherein the connection element is molded on the ball.

10. A device according to claim 1, wherein the connection(s) are dimensioned in such a manner that after assembly of the combined device, a first amount of compression prestress is applied to the balls.

11. A device according to claim 1, wherein the elements for assembling to the torque tube for pitch control are dimensioned in such a manner that after assembly of the combined device, a second amount of compression prestress is applied to the laminated dampers.

12. A device according to claim 10, wherein the elements for assembling to the torque tube for pitch control are dimensioned in such a manner that after assembly of the combined device, a second amount of compression prestress is applied to the laminated dampers, and wherein the first and second amounts of prestress have different values.

13. A helicopter rotor, including at least one combined device according to claim 1, mounted between a said flexible spar and a said torque tube for controlling pitch.

14. A helicopter rotor according to claim 13, wherein at least one combined device is mounted with a first amount of prestress applied to the balls.

15. A helicopter rotor according to claim 13, wherein at least one combined device is mounted with a second amount of compression prestress applied to the laminated dampers.

16. A helicopter rotor according to claim 14, wherein at least one combined device is mounted with a second amount of compression prestress applied to the laminated dampers, and wherein the first and second amounts of prestress have different values.

* * * * *

UNITED STATES PATENT AND TRADEMARK OFFICE
CERTIFICATE OF CORRECTION

PATENT NO.     : 6,832,894 B2
DATED          : December 21, 2004
INVENTOR(S)    : Levallard et al.

It is certified that error appears in the above-identified patent and that said Letters Patent is hereby corrected as shown below:

<u>Title page,</u>
Item [75], Inventor, "Thierry Sieg, Vineuil St Firmain (FR)" should read
-- Thierry Sieg, Vineuil St Firmin (FR) --

Signed and Sealed this

Fifth Day of July, 2005

JON W. DUDAS
*Director of the United States Patent and Trademark Office*